United States Patent

[11] 3,601,608

[72] Inventors Dwight L. Randall
Arlington;
William W. Campbell, Jr., Springfield, Va.;
Franklin H. Harris, Accokeek, Md.
[21] Appl. No. 804,877
[22] Filed Mar. 6, 1969
[45] Patented Aug. 24, 1971
[73] Assignee The United States of America as represented by the Secretary of the Navy

[54] ABSOLUTE HUMIDIOMETER
4 Claims, 2 Drawing Figs.
[52] U.S. Cl. .................................................. 250/43.5 MR
[51] Int. Cl. .................................................. G01n 23/12
[50] Field of Search .................................... 250/43.5, 83.3 UV

[56] References Cited
UNITED STATES PATENTS

| | | | |
|---|---|---|---|
| 2,654,845 | 10/1953 | Presenz ........................ | 250/43.5 |
| 3,180,984 | 4/1965 | Fertig et al. ................... | 250/43.5 |
| 3,180,990 | 4/1965 | Randall et al. ................. | 250/83.3 |
| 3,402,294 | 9/1968 | Bargainer, Jr. ................ | 250/83.6 X |

*Primary Examiner*—James W. Lawrence
*Assistant Examiner*—Davis L. Willis
*Attorneys*—R. S. Sciascia and A. L. Branning ABSTRACT: An instrument for measuring absolute humidity by comparing the attenuation of Lyman-alpha radiation through a reference chamber containing a dry gas with the attenuation through a sample chamber containing moist gas. The optical path lengths of the two chambers are matched by varying the length of the sample chamber. The outputs of the respective nitric oxide detectors, which measure the intensity of radiation transmitted through the chambers, are compared directly by a differential amplifier circuit to provide an output indicative of the absolute humidity of the sample.

3,601,608

ABSOLUTE HUMIDIOMETER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to humidiometers and more particularly to a new and improved instrument for measuring the absolute humidity of a sample, wherein changes in the intensity of ultraviolet radiation passing through a sample are indicative of the amount of water vapor present in the sample.

In the past, the humidity of a sample has been measured in various ways many of which involved the conversion of the water vapor to a liquid or solid form and then quantitatively determining the amount of water present, however such methods are time consuming consuming and seldom offer a satisfactory degree of precision and accuracy. Recently, a Lyman-alpha humidiometer has been employed to measure the water vapor content of air, utilizing the principle that Lyman-alpha radiation is absorbed by water vapor. Typically, these humidiometers have employed hydrogen tubes to emit Lyman-alpha radiation across a sampling path to a nitric oxide detector tube acting as a radiation detector and having electrical circuitry coupled thereto for producing a signal indicative of the ionization current developed in the nitric oxide tube. The amount of ionization current generated by the nitric oxide tube is proportional to the amount of radiation impinging upon the detector. In prior humidiometers, the Lyman-alpha radiation intensity of the source was held at a given level by maintaining a constant level of ionizing current through the source tube. The change in water vapor content of the air passing through the sample path varied the intensity of the radiation at the nitric oxide detector and a signal proportional to the detected radiation was amplified and measured as indication of the water vapor content of the sample. The prior humidiometers served their purpose of measuring relative humidity but could not be used to provide an indication of the absolute humidity of the prior humidifiers served their purpose of measuring relative humidity but could not be used to provide an indication of the absolute humidity of the sample. These instruments were sensitive to radiation attenuation caused not only by the presence of the water vapor but also to attenuation caused by the presence of the dry air or carrier gas, there being several gases including dry air which have a part of the same absorption band in common with water vapor. Although the amount of radiation absorbed by the dry air could be calculated and appropriate corrections to the data made, these corrective steps are both cumbersome and time consuming and therefore could not be tolerated in systems requiring a fast response time to changes in water vapor content.

SUMMARY OF THE INVENTION

The general purpose of this invention is to provide a Lyman-alpha humidity of a sample and which embraces all of the advantages of prior humidiometers and yet possesses none of their disadvantages. In order to attain this, a dual window hydrogen lamp for directing Lyman-alpha radiation through a reference chamber containing dry air and also through a measuring chamber containing the moist air sample. The radiation transmitted through these chambers is measured by nitric oxide detectors, the output of which is proportional to the intensity of the radiation impinging upon each detector. A differential amplifier means is used for comparing the signals generated by each detector so that the attenuation caused by the dry air is subtracted from the attenuation caused by the moist air sample, thus compensating for the effects of the dry air upon the reading and thereby providing a direct measurement of absolute humidity of the sample. In order to calibrate the instrument so that the dry air attenuation may be effectively cancelled, the optical path lengths of the reference and sampling chambers matched by adjustably mounting the detector in the sampling chamber to permit the length of the sampling path to be selectively varied.

OBJECTS OF THE INVENTION

It is therefore an object of this invention to provide an instrument for measuring the amount of water vapor in air or other gases without first converting the water vapor to a liquid or solid state.

Another object is to provide a humidiometer capable of directly measuring the absolute humidity of a sample gas with precise accuracy.

A further object of the invention is to provide an absolute humidiometer which is free of errors due to the Lyman-alpha radiation output drift of the hydrogen tube.

Still another object of this invention is to provide an absolute humidiometer which automatically compensates for the presence of carrier gases having part of the same radiation absorption band as water vapor.

Other objects, advantages, and novel features of the invention will become apparent from the following detailed description of the invention when considered in conjunction with the accompanying drawings wherein:

DESCRIPTION OF THE PREFERRED EMBODIMENT

Figure 1:
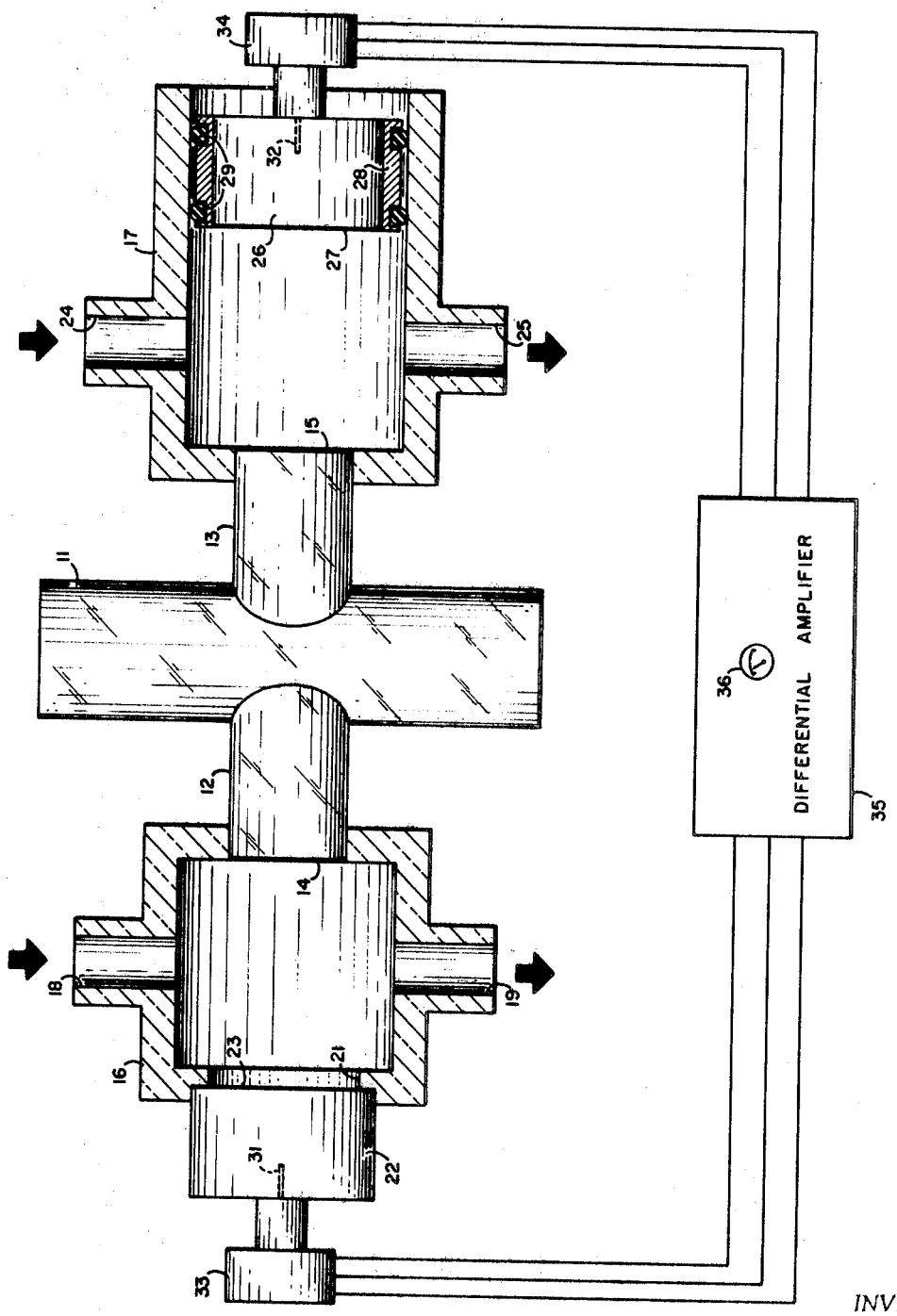
FIG. 1 illustrates an elevational view, partially in section, of the humidiometer constructed in accordance with a preferred embodiment of the invention with the electrical circuitry shown in block diagram form.

Referring now to FIG. 1 of the drawings, there is shown a humidiometer having a Lyman-alpha radiation source 11 comprising a hydrogen tube which, when subjected to a suitable voltage source, not shown, emits ultraviolet light of approximately 1216 angstroms through a pair of transverse extensions 12 and 13 of the hydrogen tube 11. The hydrogen tube may be of the general type disclosed in U.S. Pat. No. 3,180,990 to D.L. Randall et al. issued Apr. 27, 1965. Lithium fluoride windows 14 and 15 are placed across the ends of the extensions 12 and 13 respectively to permit the Lyman-alpha radiation to be transmitted through the windows while maintaining the hermetic seal of the tube.

The humidiometer further includes a reference chamber 16 and a sampling chamber 17 each respectively being hermetically sealed to the extensions 12 and 13 of the hydrogen tube. The reference chamber and sampling chamber each have apertures formed in the end walls thereof for coupling to the transverse extensions of the hydrogen tube in such manner that radiation from the tube 11 passes through the lithium fluoride windows 14 and 15 and along the longitudinal axes of the reference and sampling chambers. The reference chamber is provided with a fluid inlet port 18 and an outlet port 19 to permit the flow of a dry reference gas therethrough. The reference chamber further includes a through-aperture 21 formed in the end wall thereof in axial alignment with the transverse extension 12 of the hydrogen tube. Fixedly mounted within the aperture 21 of the reference chamber is a radiation detector 22 which may preferably be a chamber filled with nitric oxide and having a lithium fluoride window 23 forming one wall thereof to permit radiation to be transmitted to the interior of the detector. The transmission of Lyman-alpha radiation into the nitric oxide detector causes photoionization within the detector chamber resulting in a current flow in the measuring circuit associated with the detector.

Referring now to the sampling chamber 17, this chamber is hermetically sealed to hydrogen tube extension 13 and is provided with fluid inlet and outlet ports 24 and 25 respectively, for the purpose of permitting a sample gas to flow therethrough. The sampling chamber also has a nitric oxide detector 26 mounted in one end thereof in axial alignment with the lithium fluoride window 15 of the hydrogen tube. This radiation detector also has a lithium fluoride window 27 adapted to receive radiation transmitted through the sampling chamber. Detector 26 is mounted in an annular collar 28; and the detector-collar assembly is adjustably mounted within the cylindrical interior wall of the sampling chamber by means of O-rings 29 which provide an hermetic seal between the detector-collar assembly and the sampling chamber while permitting the detector 26 to be selectively moved along the longitudinal axis of the sampling chamber to vary the distance between the detector 26 and the lithium window 15.

The invention thus includes a humidiometer having a hydrogen tube for emitting Lyman-alpha radiation through a reference chamber and a sampling chamber to a pair of nitric oxide detectors causing current to flow in the metering circuit associated with the nitric oxide detector tubes. The nitric oxide detectors have probes 31 and 32 therein for sensing the ionization current produced by the radiation. The measuring circuit includes first and second preamplifiers 33 and 34 coupled respectively to nitric oxide detectors 22 and 26. The magnitude of the signals generated by detectors 22 and 26 are proportional to the intensity of the radiation falling upon the detectors and since this radiation is attenuated by the presence of water vapor, which absorbs Lyman-alpha radiation, these signals are proportional to the amount of water vapor present in gas. The radiation however may also be attenuated by the presence of other gases having absorption bands common the water vapor absorption band, one such gas being air. Therefore, in order to obtain a reading of the absolute humidity, the instrument must compensate for the amount of absorption caused by the dry air. For this reason, dry air is passed through reference chamber 16 while the moist air sample containing the water vapor is passed through the sampling chamber 17 and the signals generated by the detectors 22 and 26 are compared in a differential amplifier 35 which subtracts the moist air signal of detector 22 from the dry air signal generated by detector 26. The resultant signal displayed by the indicator 35 associated with the differential amplifier is indicative of absolute humidity.

In order for such indication to be accurate, the optical path lengths of the reference and sampling chambers must be identical. If there exists any variance in the optical transmission characteristics among the several lithium fluoride windows employed in the system, the optical path lengths are affected by such variances and for this reason, the detector 26 is adjustably mounted within the sampling chamber may be selectively varied to achieve an identical match of the optical path lengths for the reference and sampling chambers. Thus when calibrating the instrument, the effective optical path lengths may be identically matched to assure the accuracy of the measurement of absolute humidity.

Figure 2:
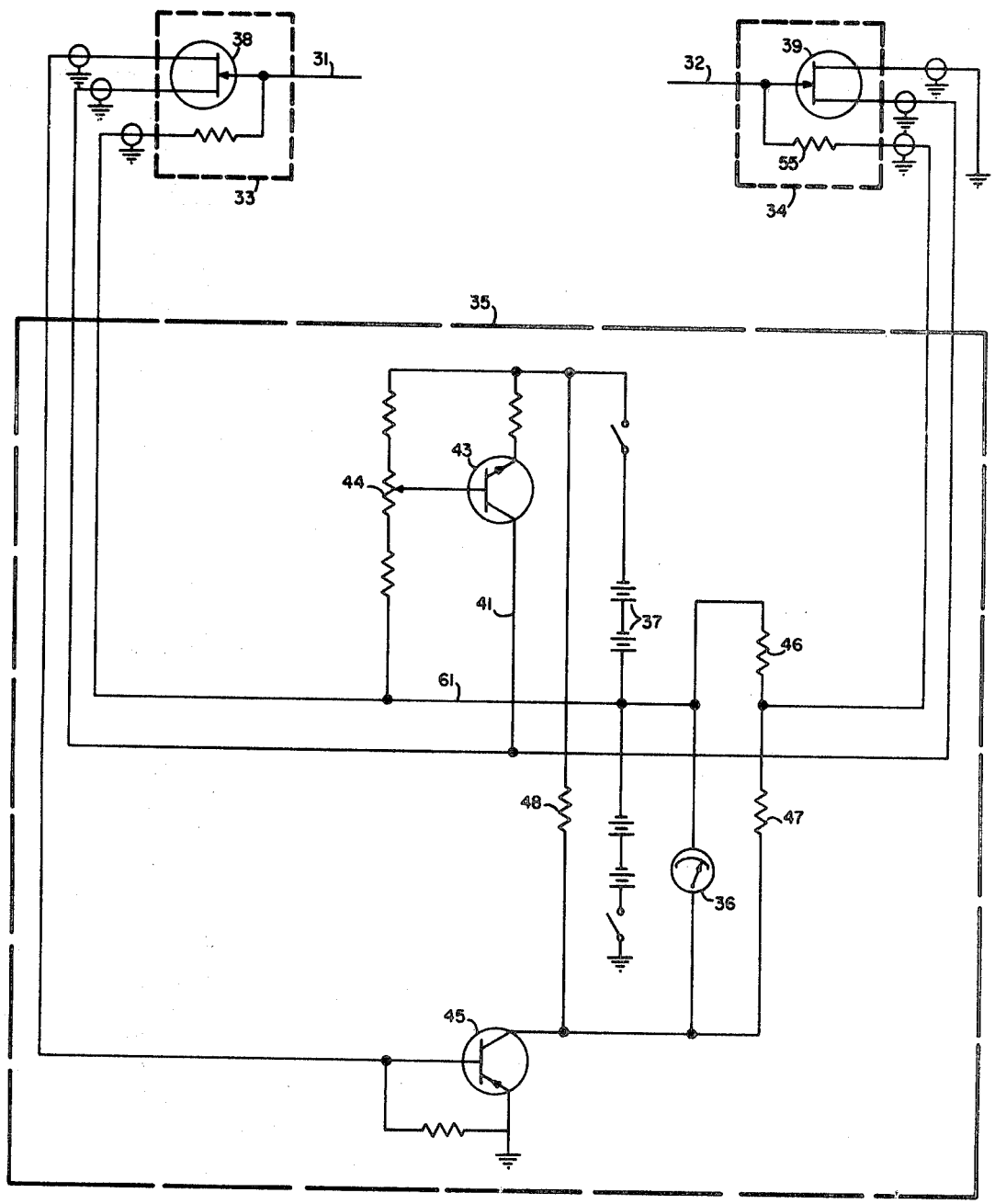
FIG. 2 illustrates the electrical circuit which compares the two signals derived from the instrument to provide an indication of absolute humidity.

Referring now to FIG. 2, the measuring circuit associated with the humidiometer is shown. The differential amplifier is shown within dashed lines 35 and the preamplifiers are shown within dashed lines 33 and 34. Preamplifiers 33 and 34 include field effect transistors 38 and 39 respectively having their gates connected to detectors probes 31 and 32. The source electrode of the field effect transistors 38 and 39 are both coupled to a conductor 41 through which a constant current is flowing between the sources of field effect transistor 38 and 39 and an NPN-transistor 43 which is used to maintain the constant current, with respect to changes in voltage on the collector. The base of transistor 43 is coupled to rheostat 44 for adjusting the level of the constant current and to assure that zero offset voltage conditions are met. The drain electrode of field effect transistor 38 is coupled to the base of the PNP-transistor 45 which functions as the output amplifier to meter 36. Resistor 48 serves as the load for transistor 45. The output of transistor 45 is coupled to one side of a zero center meter 36 which has its other side coupled to electrical common 61. Stabilization of this differential-input amplifier is accomplished by means of negative feedback thus: a portion of the output voltage from transistor 45 is coupled to the gate of field effect transistor 39 by means of resistors 47, 46, and load resistor 55. (The effective voltage gain of the differential amplifier is approximately $(R_{47}+R_{46}/R_{46})$.

The instrument is calibrated by first, with no input to the preamplifiers, adjusting rheostat 44 for zero indication on the voltmeter. Identical gases are then passed through both the reference chamber and sampling chamber and, if meter 36 does not register zero, the length of the sampling chamber is adjusted by moving the detector 26 until meter 36 registers zero. The linearity of the system has now been matched. Therefore meter 36 may now be calibrated for direct readout of absolute humidity by introducing into sampling chamber 17 samples of known water vapor content.

It may be seen therefore that the present invention provides a system for directly measuring the absolute humidity of a sample gas. The device of invention has a rapid response time to changes in water vapor content and is suitable for continuously monitoring the water vapor content of gas flowing through the sampling chamber.

Obviously many modifications and variations of the present invention are possible in light of the above teachings. For example a recorder may be coupled to meter 36 to record the variations in absolute humidity as measured by the instrument. It is also anticipated that the output of meter 36 may be coupled to a radio transmitter to relay the measurements to a receivers on earth if the instrument is launched on a balloon or rocket to take measurements of the upper atmosphere.

What we claimed and desired to be secured By Letter Patent of the United States is:

1. An instrument for measuring absolute humidity comprising:

a radiation source for emitting Lyman-alpha radiation in at least two directions;

first and second hollow chambers, each having a pair of aligned apertures formed therein and each being positioned to receive Lyman-alpha radiation from said source through one of said apertures, said first and second chambers each having one aperture hermetically sealed to a portion of said radiation source to receive radiation into said chambers;

first and second radiation detectors, each received in the other respective aperture of said chambers for producing electrical signals proportional to the amount of radiation impinging upon said detectors, said first detector being hermetically mounted within said first chamber, said second detector being hermetically and adjustably mounted within said second chamber for selectively varying the distance between said second detector and said radiation source; and circuit means for comparing said signals and providing an output proportional to the difference between said signals, whereby, when a dry gas is introduced into said first chamber and a sample of like gas containing water vapor is introduced into said second chamber, the output of said circuit means is indicative of the absolute humidity of the sample gas.

2. The device of claim 1 wherein:

said first chamber includes fluid inlet and outlet ports formed therein for passing a dry reference gas through the first chamber, and said second chamber includes fluid inlet and outlet ports formed therein for passing a sample gas containing water vapor through the second chamber.

3. The device of claim 2 wherein said circuit means includes:

first and second preamplifiers coupled to said first and second detectors respectively, a differential amplifier coupled to said preamplifiers for providing an output proportional to difference of the outputs of said first and second detectors, and a zero-center meter for indicating the output of said differential amplifier as a function of absolute humidity.

4. The device of claim 1 wherein said first and second detectors each comprise an ionization chamber containing nitric oxide gas and having a lithium fluoride window forming one wall thereof to receive the radiation from said source into the ionization chambers.